(12) United States Patent
Lambert et al.

(10) Patent No.: US 9,380,401 B1
(45) Date of Patent: Jun. 28, 2016

(54) SIGNALING SCHEMES ALLOWING DISCOVERY OF NETWORK DEVICES CAPABLE OF OPERATING IN MULTIPLE NETWORK MODES

(75) Inventors: Paul A. Lambert, Mountain View, CA (US); Frank Huang, Pleasanton, CA (US)

(73) Assignee: Marvell International LTD., Hamilton (BM)

( * ) Notice: Subject to any disclaimer, the term of this patent is extended or adjusted under 35 U.S.C. 154(b) by 651 days.

(21) Appl. No.: 13/009,132

(22) Filed: Jan. 19, 2011

Related U.S. Application Data

(60) Provisional application No. 61/301,129, filed on Feb. 3, 2010.

(51) Int. Cl.
  *H04W 4/00* (2009.01)
  *H04W 84/18* (2009.01)
  *H04W 84/12* (2009.01)

(52) U.S. Cl.
  CPC .............. *H04W 4/00* (2013.01); *H04W 84/18* (2013.01); *H04W 84/12* (2013.01)

(58) Field of Classification Search
  CPC ...... H04W 28/021; H04W 4/00; H04W 84/18
  USPC ................. 370/338, 337, 339, 328, 329, 330; 455/517, 219, 225, 551, 560
  See application file for complete search history.

(56) References Cited

U.S. PATENT DOCUMENTS

| | | | |
|---|---|---|---|
| 5,735,583 A | 4/1998 | Katayama et al. | |
| 5,738,583 A | 4/1998 | Comas et al. | |
| 5,907,566 A | 5/1999 | Benson et al. | |
| 6,182,248 B1 | 1/2001 | Armstrong et al. | |
| 6,272,120 B1 | 8/2001 | Alexander | |
| 6,287,200 B1 | 9/2001 | Sharma | |
| 6,397,357 B1 | 5/2002 | Cooper | |
| 6,587,691 B1 | 7/2003 | Granstam et al. | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,592 B1 | 8/2004 | Smith et al. | |
| 6,785,892 B1 | 8/2004 | Miller et al. | |
| 6,788,675 B1 | 9/2004 | Yang | |

(Continued)

OTHER PUBLICATIONS

Meredith, John; "Voice Call Continuity in 3GPP"; CompactPCI and AdvancedTCA systems; Apr. 2006; 2 pages.

(Continued)

*Primary Examiner* — Abdelnabi Musa

(57) ABSTRACT

A network device includes a receiving module and a detecting module. The receiving module is configured to receive a beacon transmitted by a remote device operating in one of a plurality of network modes, or a probe response transmitted by the remote device in response to a probe request transmitted by the network device. The beacon or the probe response includes an information element indicating that the remote device is capable of operating in the plurality of network modes. The plurality of network modes includes an ad-hoc mode, an infrastructure mode, a mesh mode, and a WiFi direct peer-to-peer mode. The detecting module is configured to detect the remote device as capable of operating in the plurality of network modes based on the information element.

4 Claims, 3 Drawing Sheets

(56) References Cited

U.S. PATENT DOCUMENTS

| | | |
|---|---|---|
| 6,793,580 B2 | 9/2004 | Sinclair et al. |
| 6,795,701 B1 | 9/2004 | Baker et al. |
| 6,799,056 B2 | 9/2004 | Curley et al. |
| 6,859,460 B1 | 2/2005 | Chen |
| 6,879,574 B2 | 4/2005 | Naghian et al. |
| 6,879,812 B2 | 4/2005 | Agrawal et al. |
| 6,909,705 B1 | 6/2005 | Lee et al. |
| 6,932,698 B2 | 8/2005 | Sprogis |
| 6,973,580 B1 | 12/2005 | Carroll et al. |
| 7,013,391 B2 | 3/2006 | Herle et al. |
| 7,024,199 B1 | 4/2006 | Massie et al. |
| 7,072,323 B2 | 7/2006 | Roberts et al. |
| 7,073,129 B1 | 7/2006 | Robarts et al. |
| 7,085,257 B1 | 8/2006 | Karves et al. |
| 7,087,562 B2 | 8/2006 | Abe et al. |
| 7,097,562 B2 | 8/2006 | Gagner |
| 7,136,642 B1 | 11/2006 | Massie et al. |
| 7,143,171 B2 | 11/2006 | Eriksson et al. |
| 7,162,238 B1 | 1/2007 | Massie et al. |
| 7,181,544 B2 | 2/2007 | Vangal et al. |
| 7,224,964 B2 | 5/2007 | Souissi et al. |
| 7,236,772 B1 | 6/2007 | Botzas |
| 7,251,235 B2 | 7/2007 | Wentink |
| 7,308,263 B2 | 12/2007 | Gallagher et al. |
| 7,324,444 B1 | 1/2008 | Liang et al. |
| 7,400,722 B2 | 7/2008 | Qi et al. |
| 7,435,179 B1 | 10/2008 | Ford |
| 7,440,430 B1 | 10/2008 | Jagadeesan et al. |
| 7,452,278 B2 | 11/2008 | Chen et al. |
| 7,551,930 B2 | 6/2009 | Lempio et al. |
| 7,580,866 B2 | 8/2009 | Church |
| 7,656,847 B2 | 2/2010 | Mela et al. |
| 7,710,982 B2 | 5/2010 | Ohmuro et al. |
| 7,779,334 B2 | 8/2010 | Earle et al. |
| 7,817,545 B2 | 10/2010 | Ho et al. |
| 7,881,284 B2 | 2/2011 | Lin et al. |
| 7,899,017 B2 * | 3/2011 | Yu et al. ............ 370/338 |
| 7,970,384 B1 | 6/2011 | Lambert et al. |
| 8,099,109 B2 | 1/2012 | Altman et al. |
| 8,099,318 B2 | 1/2012 | Moukas et al. |
| 8,165,034 B2 | 4/2012 | Buchwald et al. |
| 8,194,600 B2 * | 6/2012 | Nagaraja ............ 370/329 |
| 8,194,629 B2 * | 6/2012 | Agulnik et al. ........... 370/338 |
| 8,257,177 B1 | 9/2012 | Saund et al. |
| 8,279,884 B1 | 10/2012 | Narasimha et al. |
| 8,325,659 B2 * | 12/2012 | Chen et al. .......... 370/329 |
| 8,351,394 B2 * | 1/2013 | Yao ............ H04W 48/18 370/331 |
| 8,374,584 B1 | 2/2013 | Lambert et al. |
| 8,411,656 B2 * | 4/2013 | Liu ............ 370/338 |
| 8,411,662 B1 | 4/2013 | Saund et al. |
| 8,428,079 B1 * | 4/2013 | Lambert ............ H04W 8/005 370/254 |
| 8,489,669 B2 | 7/2013 | Johnson |
| 8,616,975 B1 | 12/2013 | Saund et al. |
| 8,825,016 B1 | 9/2014 | Lambert et al. |
| 8,937,963 B1 | 1/2015 | Narasimha et al. |
| 9,185,732 B1 | 11/2015 | Saund et al. |
| 2002/0087370 A1 | 7/2002 | Brueckheimer et al. |
| 2002/0147642 A1 | 10/2002 | Avallone et al. |
| 2002/0147913 A1 | 10/2002 | Lun Yip |
| 2002/0151366 A1 | 10/2002 | Walker et al. |
| 2002/0152388 A1 | 10/2002 | Linnartz et al. |
| 2002/0157044 A1 | 10/2002 | Byrd |
| 2002/0169539 A1 | 11/2002 | Menard et al. |
| 2002/0169653 A1 | 11/2002 | Greene et al. |
| 2002/0191560 A1 | 12/2002 | Chen et al. |
| 2002/0199124 A1 | 12/2002 | Adkisson |
| 2003/0065805 A1 | 4/2003 | Barnes |
| 2003/0069018 A1 | 4/2003 | Matta et al. |
| 2003/0088690 A1 | 5/2003 | Zuckerman et al. |
| 2003/0105667 A1 | 6/2003 | Millikan |
| 2003/0115320 A1 | 6/2003 | Yarroll et al. |
| 2003/0133422 A1 | 7/2003 | Bims |
| 2003/0152093 A1 | 8/2003 | Gupta et al. |
| 2003/0169755 A1 | 9/2003 | Ternovsky |
| 2003/0182454 A1 | 9/2003 | Huth et al. |
| 2003/0224855 A1 | 12/2003 | Cunningham |
| 2003/0231189 A1 | 12/2003 | Williams |
| 2003/0231625 A1 | 12/2003 | Calvignac |
| 2003/0235175 A1 * | 12/2003 | Naghian et al. ............ 370/338 |
| 2004/0066751 A1 | 4/2004 | Tseng et al. |
| 2004/0081106 A1 | 4/2004 | Bruhn |
| 2004/0082383 A1 | 4/2004 | Muncaster et al. |
| 2004/0105415 A1 | 6/2004 | Fujiwara et al. |
| 2004/0120309 A1 | 6/2004 | Kurittu et al. |
| 2004/0127277 A1 | 7/2004 | Walker et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2004/0203350 A1 | 10/2004 | Shultz et al. |
| 2004/0225932 A1 | 11/2004 | Hoda et al. |
| 2004/0236850 A1 | 11/2004 | Krumm et al. |
| 2004/0243887 A1 | 12/2004 | Sharma et al. |
| 2005/0025163 A1 * | 2/2005 | Christie ............ 370/401 |
| 2005/0032577 A1 | 2/2005 | Blackburn et al. |
| 2005/0041660 A1 | 2/2005 | Pennec et al. |
| 2005/0041793 A1 | 2/2005 | Fulton et al. |
| 2005/0041796 A1 | 2/2005 | Joseph et al. |
| 2005/0058112 A1 * | 3/2005 | Lahey et al. ............ 370/338 |
| 2005/0060547 A1 | 3/2005 | Saito et al. |
| 2005/0073980 A1 | 4/2005 | Thomson et al. |
| 2005/0079873 A1 | 4/2005 | Caspi et al. |
| 2005/0099977 A1 | 5/2005 | Williams et al. |
| 2005/0157661 A1 | 7/2005 | Cho |
| 2005/0177445 A1 | 8/2005 | Church |
| 2005/0177639 A1 | 8/2005 | Reunamaki et al. |
| 2005/0181872 A1 | 8/2005 | Acharya et al. |
| 2005/0197189 A1 | 9/2005 | Schultz |
| 2005/0207342 A1 | 9/2005 | Tanabe et al. |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0286456 A1 | 12/2005 | McNew et al. |
| 2006/0041750 A1 | 2/2006 | Carter et al. |
| 2006/0045138 A1 | 3/2006 | Black et al. |
| 2006/0046709 A1 | 3/2006 | Krumm et al. |
| 2006/0063539 A1 | 3/2006 | Beyer, Jr. |
| 2006/0135262 A1 | 6/2006 | Kennedy et al. |
| 2006/0166740 A1 | 7/2006 | Sufuentes |
| 2006/0172736 A1 * | 8/2006 | Nevo ............ 455/435.1 |
| 2006/0205409 A1 | 9/2006 | Chiou et al. |
| 2006/0215576 A1 * | 9/2006 | Yu et al. ............ 370/252 |
| 2006/0221857 A1 | 10/2006 | Bushnell et al. |
| 2006/0268711 A1 | 11/2006 | Doradla et al. |
| 2007/0026866 A1 | 2/2007 | Krishnamurthi et al. |
| 2007/0035513 A1 | 2/2007 | Sherrard et al. |
| 2007/0047547 A1 | 3/2007 | Conner et al. |
| 2007/0047697 A1 | 3/2007 | Drewry et al. |
| 2007/0060128 A1 * | 3/2007 | Kil ............ H04W 88/08 455/436 |
| 2007/0060355 A1 | 3/2007 | Amaitis et al. |
| 2007/0060358 A1 | 3/2007 | Amaitis et al. |
| 2007/0076683 A1 | 4/2007 | Chung et al. |
| 2007/0078000 A1 | 4/2007 | Saund et al. |
| 2007/0082671 A1 | 4/2007 | Feng et al. |
| 2007/0086394 A1 | 4/2007 | Yamada et al. |
| 2007/0086401 A1 * | 4/2007 | Hong et al. ............ 370/338 |
| 2007/0099703 A1 | 5/2007 | Terebilo |
| 2007/0192183 A1 | 8/2007 | Monaco et al. |
| 2007/0197237 A1 | 8/2007 | Powell et al. |
| 2007/0202910 A1 | 8/2007 | Brewer et al. |
| 2007/0258415 A1 * | 11/2007 | Lu et al. ............ 370/338 |
| 2007/0286111 A1 * | 12/2007 | Corson et al. ............ 370/319 |
| 2008/0039015 A1 | 2/2008 | Nakata et al. |
| 2008/0052603 A1 | 2/2008 | Wiatrowski et al. |
| 2008/0062940 A1 | 3/2008 | Othmer et al. |
| 2008/0069105 A1 | 3/2008 | Costa et al. |
| 2008/0082671 A1 | 4/2008 | Meijer et al. |
| 2008/0095112 A1 | 4/2008 | Wiemann et al. |
| 2008/0101400 A1 | 5/2008 | Auterinen |
| 2008/0123608 A1 | 5/2008 | Edge et al. |
| 2008/0176561 A1 * | 7/2008 | Shao et al. ............ 455/434 |
| 2008/0214216 A1 | 9/2008 | Bragg et al. |

(56) References Cited

U.S. PATENT DOCUMENTS

| | | |
|---|---|---|
| 2008/0228547 A1 | 9/2008 | Doss et al. |
| 2009/0012704 A1 | 1/2009 | Franco et al. |
| 2009/0043658 A1 | 2/2009 | Webb et al. |
| 2009/0181728 A1* | 7/2009 | Park .............................. 455/574 |
| 2009/0191878 A1 | 7/2009 | Hedqvist et al. |
| 2009/0222358 A1 | 9/2009 | Bednarek |
| 2009/0307091 A1 | 12/2009 | Lilley |
| 2009/0319348 A1 | 12/2009 | Khosravy et al. |
| 2009/0323648 A1* | 12/2009 | Park et al. ..................... 370/338 |
| 2010/0023401 A1 | 1/2010 | Ariyibi |
| 2010/0070369 A1 | 3/2010 | Fenton et al. |
| 2010/0093374 A1 | 4/2010 | Dacosta |
| 2010/0111066 A1* | 5/2010 | Mehta ............... H04W 52/0216 370/345 |
| 2010/0144372 A1 | 6/2010 | Bouwer |
| 2010/0274626 A1 | 10/2010 | Carlson |
| 2010/0285776 A1 | 11/2010 | de Froment |
| 2011/0029359 A1 | 2/2011 | Roeding et al. |
| 2011/0060652 A1 | 3/2011 | Morton |
| 2011/0066369 A1 | 3/2011 | Klassen et al. |
| 2011/0066485 A1 | 3/2011 | Rissanen |
| 2011/0093876 A1 | 4/2011 | Belz et al. |
| 2011/0269431 A1 | 11/2011 | Hardy et al. |
| 2012/0095844 A1 | 4/2012 | Barnes, Jr. |
| 2012/0106728 A1 | 5/2012 | Ghaffari et al. |
| 2013/0096966 A1 | 4/2013 | Barnes, Jr. |

OTHER PUBLICATIONS

"Universal Mobile Access: UMA Expands Beyond Dual-Mode Handsets"; The UMA Company; Jan. 2007; 8 pages.

IEEE Standards Board. IEEE 802.11 Standard, 1999.1999 Edition.

Newton, Harry. Newton's Telecom Dictionary. 15th Edition. Miller Freeman Inc., 1999. 762. (3 pages).

"Client-Server Protocol Session and Transactions", Approved Version 1.3; Open Mobile Alliance Ltd; Jan. 23, 2007; 206 pages.

"IMPS Architecture", Approved Version 1.3, Open Mobile Alliance Ltd.; Jan. 23, 2007; 24 pages.

* cited by examiner

SIGNALING SCHEMES ALLOWING DISCOVERY OF NETWORK DEVICES CAPABLE OF OPERATING IN MULTIPLE NETWORK MODES

CROSS-REFERENCE TO RELATED APPLICATIONS

This application claims the benefit of U.S. Provisional Application No. 61/301,129, filed on Feb. 3, 2010. The disclosure of the above application is incorporated herein by reference in its entirety.

FIELD

The present disclosure relates generally to wireless networks and more particularly to signaling schemes allowing discovery of network devices capable of operating in multiple network modes.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIGS. 1A-1D, different types of wireless networks are shown. The networks shown in FIGS. 1A-1C comply with one or more 802.11 standards developed by Institute of Electrical and Electronics Engineers (IEEE). The network shown in FIG. 1D complies with a WiFi Direct peer-to-peer (P2P) standard developed by the WiFi Alliance.

In FIG. 1A, an infrastructure network 10 includes an access point (AP) 12 and a plurality of client stations STA-1 14-1, . . . , and STA-n 14-n (collectively STAs 14). The AP 12 and the STAs 14 form a basic service set (BSS) having a BSS identifier (BSSID). The AP 12 transmits beacons to the STAs 14, where each beacon includes the BSSID. Each STA 14 communicates with the AP 12 using the BSSID. A plurality of interconnected BSSs is called an extended service set (ESS).

In FIG. 1B, an ad-hoc network 20 includes, for example, three client stations STA-1 22-1, STA-2 22-2, and STA-3 22-3 (collectively STAs 22). Although three STAs 22 are shown, the ad-hoc network 20 can include more or less than three STAs 22. The STAs 22 form an independent BSS (IBSS) having a BSSID. Each STA 22 can communicate with any of the other STAs 22 without an AP. Each STA 22 listens for a beacon and can transmit a beacon if none of the other STAs 22 transmits a beacon. The beacon includes the BSSID.

In FIG. 1C, a mesh network 30 includes network devices device-1 32-1, device-2 32-2, . . . , and device-n 32-n (collectively devices 32). Each device 32 has a unique ID and can transmit beacons that include the unique ID.

In FIG. 1D, a WiFi direct peer-to-peer (P2P) network 40 includes network devices that communicate without an AP. The network devices use signaling mechanisms of the infrastructure network 10. Each network device is capable of operating as an AP or a STA. When two network devices (e.g., AP/STA 42-1 and 42-2) discover each other, the two network devices negotiate a mode of operation. One network device (e.g., AP/STA 42-1) can operate as a group owner, which is essentially an AP, while the other network device (e.g., AP/STA 42-2) can operate as a STA, or vice versa.

SUMMARY

A network device includes a receiving module and a detecting module. The receiving module is configured to receive a beacon transmitted by a remote device operating in one of a plurality of network modes, or a probe response transmitted by the remote device in response to a probe request transmitted by the network device. The beacon or the probe response includes an information element indicating that the remote device is capable of operating in the plurality of network modes. The plurality of network modes includes an ad-hoc mode, an infrastructure mode, a mesh mode, and a WiFi direct peer-to-peer mode. The detecting module is configured to detect the remote device as capable of operating in the plurality of network modes based on the information element.

A network device includes a receiving module and a response generating module. The receiving module is configured to receive a probe request transmitted by a remote device. The response generating module is configured to generate a probe response. The probe response includes an information element indicating that the network device is capable of operating in a plurality of network modes. The plurality of network modes includes an ad-hoc mode, an infrastructure mode, a mesh mode, and a WiFi direct peer-to-peer mode.

A method for a network device includes receiving (i) a beacon transmitted by a remote device operating in one of a plurality of network modes or (ii) a probe response transmitted by the remote device in response to a probe request transmitted by the network device. The beacon or the probe response includes an information element indicating that the remote device is capable of operating in the plurality of network modes. The plurality of network modes includes an ad-hoc mode, an infrastructure mode, a mesh mode, and a WiFi direct peer-to-peer mode. The method further includes detecting the remote device as capable of operating in the plurality of network modes based on the information element.

A method for a network device includes receiving a probe request transmitted by a remote device, and generating a probe response. The probe response includes an information element indicating that the network device is capable of operating in a plurality of network modes. The plurality of network modes includes an ad-hoc mode, an infrastructure mode, a mesh mode, and a WiFi direct peer-to-peer mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1B:
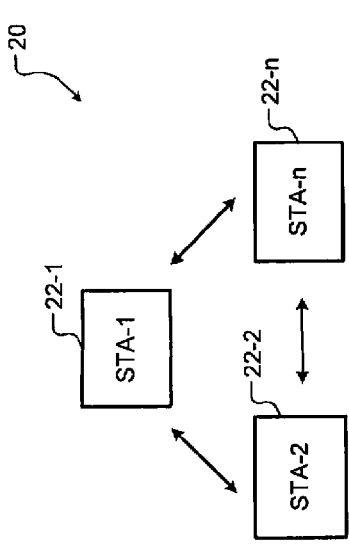
FIGS. 1A-1D depict different types of wireless networks.
Figure 1D:
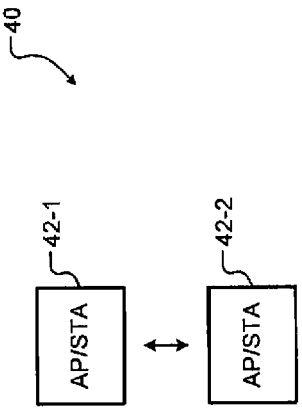
Figure 1A:
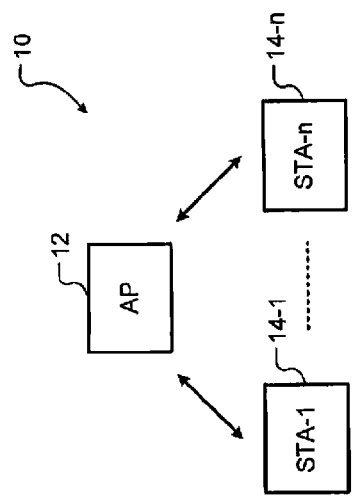
Figure 1C:
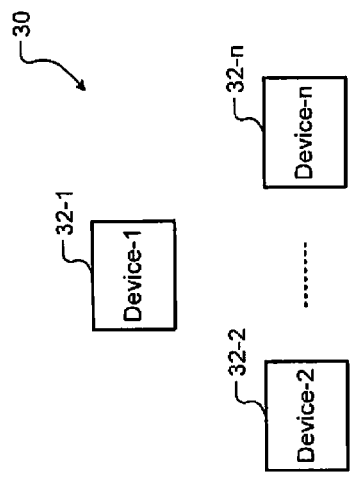

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A network device can discover another network device on a channel by scanning the channel. Scanning can be passive and/or active. In passive scanning, a network device can discover other network devices when the network device receives beacons or probe requests from the other network devices. In active scanning, the network device transmits probe requests and can discover other network devices based on probe responses received from the other network devices.

Beacons, probe requests, and/or probe responses transmitted by a network device include an information element (IE) that indicates a mode of operation of the network device. The mode of operation of the network device typically depends on the type of network in which the network device communicates and is referred to as a network mode. For example, if the network device communicates in an ad-hoc network, the IE includes a bit indicating that the network device operates in an ad-hoc network mode or simply ad-hoc mode. Similarly, if the network device communicates in an infrastructure network, the IE includes a bit indicating that the network device operates in an infrastructure network mode or simply infrastructure mode.

In passive scanning, a first network device can discover a second network device if the IE received from the second network device indicates that the second network device operates in the same network mode as the first network device. In active scanning, when a first network device receives a probe request transmitted by a second network device, the first network device transmits a probe response if the first network device operates in the same network mode as the second network device. The second network device discovers the first network device based on the probe response received from the first network device.

According to IEEE 802.11 specifications, a network device capable of operating in multiple network modes is forced to indicate only one network mode in a probe response. The indicated network mode typically depends on the type of network in which the network device operates. Accordingly, a network device capable of operating in multiple network modes cannot indicate in a probe response the ability of the network device to operate in multiple network modes. Consequently, the network device cannot be discovered by network devices operating in a network mode other than the network mode indicated by the network device in the probe response.

The present disclosure relates to generating a probe response that allows a network device capable of operating in multiple network modes to be discovered by a scanning network device as a generic network device. A generic network device is a network device capable of operating in more than one network mode. Specifically, the network device can transmit a probe response that includes a new information element (IE). The new IE indicates that the network device can optionally operate in multiple network modes. Accordingly, when the scanning network device receives the probe response, the scanning network device can discover the network device as a generic network device. After discovery, the scanning network device and the discovered network device can select one of the multiple network modes and communicate using the selected network mode.

Thus, a network device can be discovered by other network devices regardless of the mode of operation of the network device and regardless of the modes of operation of the other network devices. Further, the discovered network device can negotiate with the scanning network device and select a suitable network mode of operation after discovery.

Two examples of discovering a network device according to the present disclosure are presented below. In a first example, a first network device operating in a WiFi direct peer-to-peer (P2P) mode transmits a probe request. A second network device is capable of operating in the WiFi direct P2P mode and another network mode (e.g., the ad-hoc mode). The second network device receives the probe request and transmits a probe response. The probe response includes a new IE, which indicates that the second network device can operate in the WiFi direct P2P mode and optionally in the ad-hoc mode, for example. Accordingly, the first network device discovers the second network device as being capable of operating in the WiFi direct P2P mode and optionally in the ad-hoc mode (i.e., as a generic network device). Subsequently, the first network device associates with the second network device using the WiFi direct P2P mode.

Unlike a conventional probe response, the probe response generated by the second network device does not include an independent basic service set (IBSS) bit to indicate that the second network device is capable of operating only in the ad-hoc mode, for example. Instead, the probe response includes the new IE, which indicates that the second network device can optionally operate in the ad-hoc mode in addition to being able to operate in the WiFi direct P2P mode.

Further, if the first network device is also capable of operating in the ad-hoc mode, the first network device and the second network device can negotiate a mode of operation during a setup process that follows the discovery of the second network device. During the setup process, the first network device and the second network device determine whether to operate in the WiFi direct P2P mode or the ad-hoc mode.

Thus, the second network device is not forced to indicate in the probe response that the second network device can operate only in a single network mode (e.g., the ad-hoc mode), which can preclude the first network device from discovering the second network device. Additionally, other modes of operation of the second network device (e.g., the WiFi direct P2P mode) are not foreclosed from utilization. Rather, the second network device can utilize any of the multiple network modes after being discovered by the first network device.

In a second example, a first network device operates in the ad-hoc mode in an ad-hoc network. Additionally, the first network device is capable of operating in other network modes (e.g., the infrastructure mode). The beacons transmitted by the first network device include the new IE. Specifically, the beacons do not include an IBSS bit to indicate that the first network device is operating in the ad-hoc mode. Instead, the beacons include the new IE, which indicates that the first network device can optionally operate in the infrastructure mode in addition to being able to operate in the ad-hoc mode.

Accordingly, a second network device that is not associated with the ad-hoc network can discover the first network device as a generic network device based on the beacons received from the first network device. After discovering the first network device, the second network device can communicate with the first network device using the ad-hoc mode or the infrastructure mode depending on the mode in which the second network device can operate.

Additionally, the first network device can attempt to discover other network devices external to the ad-hoc network by transmitting probe requests. The probe requests do not include the IBSS bit. Instead, the probe requests include the new IE, which indicates that the first network device can optionally operate in the infrastructure mode, for example, in addition to being able to operate in the ad-hoc mode.

When the second network device receives one of the probe requests, the second network device can transmit a probe response that includes an IE, which indicates that the second network device can operate in one or more network modes. On receiving the probe response, the first network device can discover the second network device as a generic network device based on the IE in the probe response. After discovering the second network device, the first network device and the second network device can select a suitable network mode and communicate using the selected network mode.

Figure 2A:
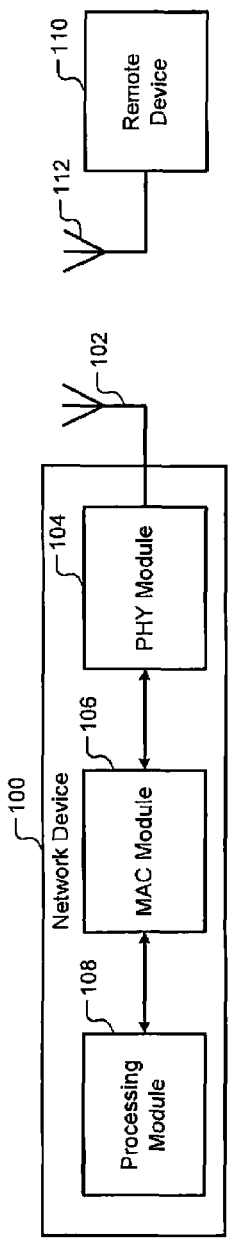
FIG. 2A is a functional block diagram of a wireless network device.
Figure 2B:
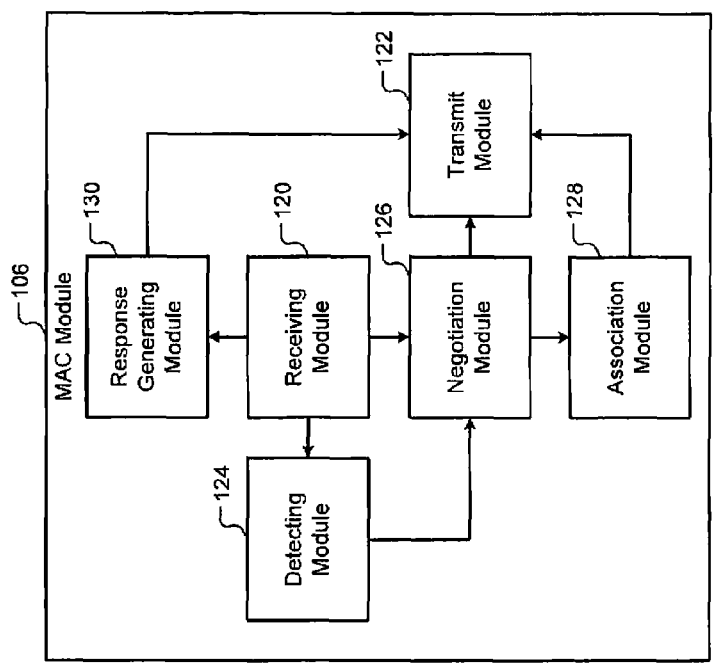
FIG. 2B is a functional block diagram of a system for discovering wireless network devices capable of operating in multiple network modes.

Referring now to FIGS. 2A and 2B, a network device 100 according to the present disclosure is shown. In FIG. 2A, the network device 100 includes an antenna 102, a physical layer (PHY) module 104, a media access control (MAC) module 106, and a processing module 108. The PHY module 104 transmits and receives data via the antenna 102. The MAC module 106 controls access of the network device 100 to the medium (e.g., air) via the antenna 102. The processing module 108 processes data transmitted and received by the network device 100 through the medium.

A remote network device (hereinafter remote device) 110 can communicate with the network device 100 via an antenna 112. While not shown, the remote device 110 can also include a PHY module, a MAC module, and a processing module similar to the network device 100. Further, although the network device 100 and the remote device 110 are shown to include a single antenna, the network device 100 and the remote device 110 can include multiple antennas.

In FIG. 2B, the network device 100 includes a system for discovering network devices capable of operating in multiple network modes according to the present disclosure. The system includes a receiving module 120, a transmit module 122, a detecting module 124, a negotiation module 126, an association module 128, and a response generating module 130.

For example only, the system can be implemented in the MAC module 106 of the network device 100 as shown. Alternatively, the system can be included in the PHY module 104 of the network device 100. In some implementations, the system can be implemented partly in the PHY module 104 and partly in the MAC module 106. While not shown, the discovery system can be similarly implemented in the remote device 110.

The receiving module 120 can receive a beacon transmitted by the remote device 110 operating in one of a plurality of network modes. Alternatively, the receiving module 120 can receive a probe response transmitted by the remote device 110 in response to a probe request transmitted by the network device 100 operating in one of a plurality of network modes. The network device 100 can transmit the probe request via the transmit module 122.

The beacon or the probe response received from the remote device 110 includes an information element (IE) according to the present disclosure. The IE indicates that the remote device 110 is capable of operating in a plurality of network modes. The plurality of network modes includes the ad-hoc mode, the infrastructure mode, a mesh mode, and a WiFi direct peer-to-peer mode.

The detecting module 124 processes the information element received from the remote device 110 and discovers the remote device 110 as a generic network device. Specifically, the detecting module 124 detects the remote device 110 as being capable of operating in the plurality of network modes based on the information element.

After the discovery of the remote device 110 is completed, the negotiation module 126 negotiates one of the network modes for communicating with the remote device 110. The association module 128 associates the network device 100 with the remote device 110 using the negotiated network mode. Subsequently, the network device 100 and the remote device 110 communicate using the negotiated network mode.

Alternatively, the receiving module 120 can receive a probe request transmitted by the remote device 110. The response generating module 130 generates a probe response on receiving the probe request from the remote device 110. The probe response includes an information element (IE) according to the present disclosure. The IE indicates that the network device 100 is capable of operating in a plurality of network modes. The plurality of network modes includes the ad-hoc mode, the infrastructure mode, the mesh mode, and the WiFi direct peer-to-peer mode. The transmit module 122 transmits the probe response.

The remote device 110 receives the probe response transmitted by the network device 100. The remote device 110 discovers the network device 100 as being capable of operating in the plurality of network modes (i.e., as a generic network device) based on the information element in the probe response.

After discovering the network device 100, the remote device 110 negotiates one of the network modes for communicating with the network device 100. The remote device 110 associates with the network device 100 using the negotiated network mode. Subsequently, the network device 100 and the remote device 110 communicate using the negotiated network mode.

Figures 3A, 3B:
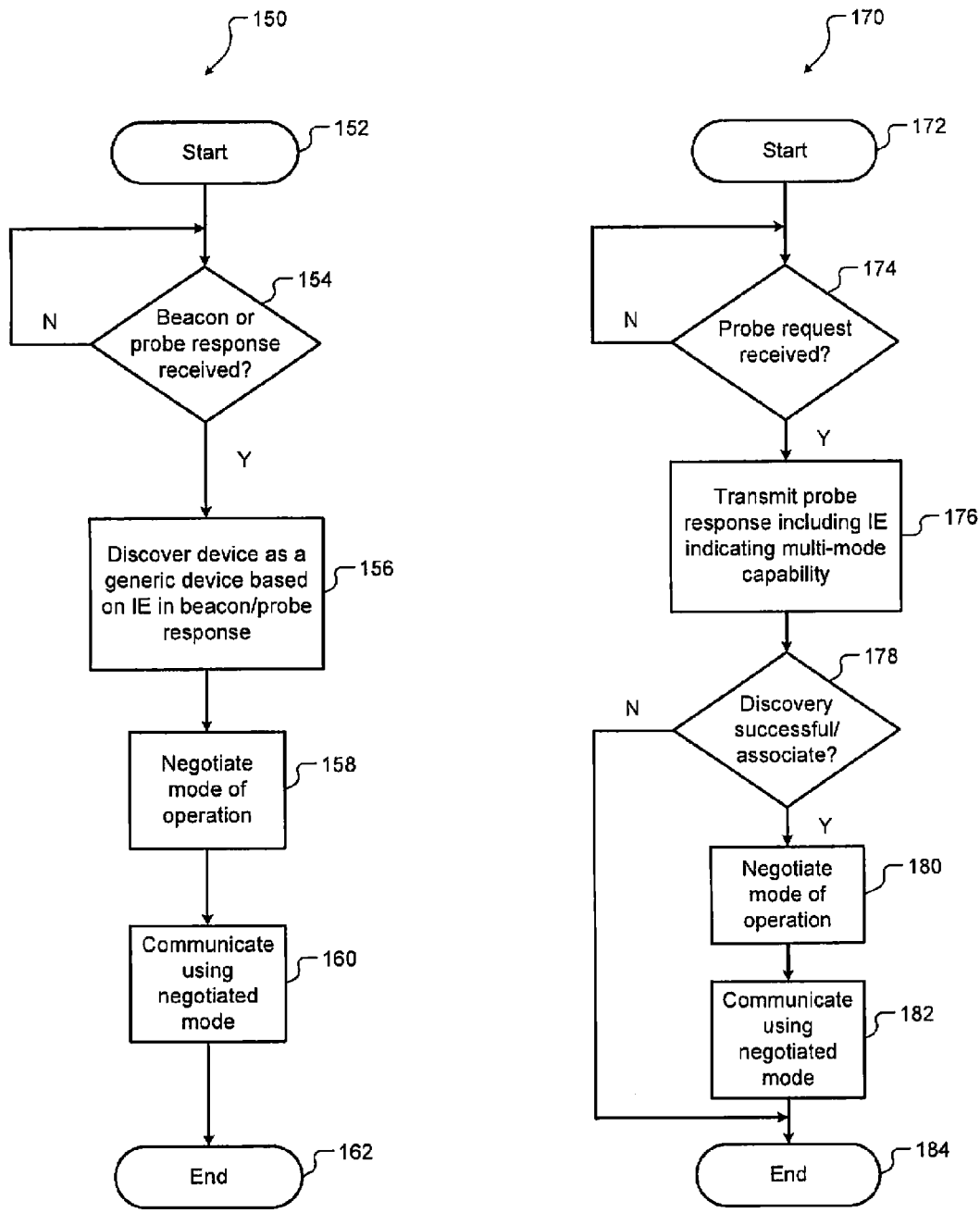
FIGS. 3A and 3B depict flowcharts of methods for discovering wireless network devices capable of operating in multiple network modes.

Referring now to FIGS. 3A and 3B, methods 150 and 170 for discovering network devices capable of operating in multiple network modes according to the present disclosure are shown. The network device 100 (or the remote device 110) can implement the methods 150 and 170 as follows.

In FIG. 3A, control begins at 152. At 154, control determines if a beacon or a probe response is received by a network device from a remote device. Control waits until a beacon or a probe response is received by the network device. At 156, if a beacon or a probe response is received by the network device, control discovers the remote device as a generic network device based on the information element included in the beacon or the probe response received from the remote device. The information element indicates that the remote device is capable of operating in multiple network modes.

At 158, control negotiates a mode of operation with the remote device. At 160, control associates the network device with the remote device using the negotiated mode, and the network device communicates with the remote device using the negotiated mode. Control ends at 162.

In FIG. 3B, control begins at 172. At 174, control determines if a probe request is received by a network device from a remote device. Control waits until a probe request is received by the network device. At 176, if a probe request is received by the network device, control transmits a probe response from the network device to the remote device. The probe response includes an information element indicating that the network device is capable of operating in multiple network modes.

At 178, control determines if the remote device discovered the network device and is negotiating a mode of operation with the network device. Control ends at 184 if the remote device fails to discover the network device, or if the remote device determines not to associate with the network device.

At 180, if the remote device discovers the network device, and if the remote device decides to associate with the network device, control negotiates a mode of operation with the remote device. At 182, control associates the network device with the remote device using the negotiated mode, and the network device communicates with the remote device using the negotiated mode. Control ends at 184.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network device comprising:
   a receiving module configured to receive a beacon transmitted from a remote device, wherein the remote device is operating in an ad-hoc mode, and wherein the beacon includes an information element indicating that the remote device is capable of operating in each of
   (i) the ad-hoc mode, wherein while operating in the ad-hoc mode, the network device and the remote device are configured to communicate with each other directly without having to communicate with each other via an access point; and
   (ii) an infrastructure mode, wherein while operating in the infrastructure mode, the network device and the remote device are configured to indirectly communicate with each other via an access point; and
   a processor configured to
   detect, based on the information element contained in the beacon transmitted from the remote device, that the remote device is capable of operating in each of the ad-hoc mode and the infrastructure mode;
   negotiate one of the ad-hoc mode and the infrastructure mode for communicating with the remote device; and
   associate the network device with the remote device using the negotiated one of the ad-hoc mode and the infrastructure mode.

2. A method comprising:
   receiving, at a network device, a beacon transmitted from a remote device, wherein the remote device is operating in an ad-hoc mode, and wherein the beacon includes an information element indicating that the remote device is capable of operating in each of (i) the ad-hoc mode, and (ii) an infrastructure mode, wherein while operating in the ad-hoc mode, the network device and the remote device are configured to communicate with each other directly without having to communicate with each other via an access point, and wherein while operating in the infrastructure mode, the network device and the remote device are configured to indirectly communicate with each other via an access point;
   detecting, based on the information element contained in the beacon transmitted from the remote device, that the remote device is capable of operating in each of the ad-hoc mode and the infrastructure mode;
   negotiating one of the ad-hoc mode and the infrastructure mode for communicating with the remote device; and
   associating the network device with the remote device using the negotiated one of the ad-hoc mode and the infrastructure mode.

3. A network device comprising:
   a receiving module configured to receive a probe response transmitted from a remote device, wherein the probe response is transmitted from the remote device in response to the remote device receiving a probe request transmitted from the network device, wherein the remote device is operating in a WiFi direct peer-to-peer mode, and wherein the probe response includes an information element indicating that the remote device is capable of operating in each of
   (i) the WiFi direct peer-to-peer mode, wherein while operating in the WiFi direct peer-to-peer mode, (a) the network device and the remote device are configured to communicate with each other directly without having to communicate with each other via an access point, and the network device and the remote device are configured to communicate using signaling mechanisms of an infrastructure network; and (b) one of the network device and the remote device operates as a group owner and the other operates as a client station; and
   (ii) an ad-hoc mode, wherein while operating in the ad-hoc mode, the network device and the remote device are configured to communicate with each other directly without having to communicate with each other via an access point; and
   a processor configured to
   detect, based on the information element contained in the probe response transmitted from the remote device, that the remote device is capable of operating in each of the WiFi direct peer-to-peer mode and the ad-hoc mode;
   negotiate one of the WiFi direct peer-to-peer mode and the ad-hoc mode for communicating with the remote device; and
   associate the network device with the remote device using the negotiated one of the WiFi direct peer-to-peer mode and the ad-hoc mode.

4. A method comprising:
   receiving, at a network device, a probe response transmitted from a remote device, wherein the probe response is transmitted from the remote device in response to the remote device receiving a probe request transmitted from the network device, wherein the remote device is operating in a WiFi direct peer-to-peer mode, and wherein the probe response includes an information element indicating that the remote device is capable of operating in each of (i) the WiFi direct peer-to-peer mode, and (ii) an ad-hoc mode, wherein while operating in the WiFi direct peer-to-peer mode, (a) the network device and the remote device are configured to communicate with each other directly without having to communicate with each other via an access point, and the network device and the remote device are configured to communicate using signaling mechanisms of an infrastructure network; and (b) one of the network device and the remote device operates as a group owner and the other operates as a client station; and wherein while operating in the ad-hoc mode, the network device and the remote device are configured to communicate with each other directly without having to communicate with each other via an access point;

detecting, based on the information element contained in the probe response transmitted from the remote device, that the remote device is capable of operating in each of the WiFi direct peer-to-peer mode and the ad-hoc mode;

negotiating one of the WiFi direct peer-to-peer mode and the ad-hoc mode for communicating with the remote device; and associating the network device with the remote device using the negotiated one of the WiFi direct peer-to-peer mode and the ad-hoc mode.

\* \* \* \* \*